United States Patent [19]
Chen

[11] Patent Number: 5,459,908
[45] Date of Patent: Oct. 24, 1995

[54] ADJUSTABLE HANDLE ASSEMBLY

[76] Inventor: Shou-Mao Chen, 58, Ma Yuan West St., Taichung, Taiwan

[21] Appl. No.: 329,155

[22] Filed: Oct. 24, 1994

[51] Int. Cl.⁶ .................................................. B25G 1/04
[52] U.S. Cl. .............................. 16/115; 280/655; 190/14; 190/104
[58] Field of Search ...................... 16/115, D12; 190/14, 190/15 R, 104, 105; 280/655, 655.1, 47.315, 37

[56] References Cited

U.S. PATENT DOCUMENTS

| | | | |
|---|---|---|---|
| 5,127,664 | 7/1992 | Cheng | 16/115 |
| 5,178,404 | 1/1993 | Chen | 280/659 |
| 5,351,984 | 10/1994 | Cheng | 280/47.315 |
| 5,371,923 | 12/1994 | Chang | 16/115 |

*Primary Examiner*—P. Austin Bradley
*Assistant Examiner*—Adesh Bhargava

[57] ABSTRACT

A handle device includes two tubes slidably engaged in two pipes which has a number of teeth. A handle is secured on top of the tubes and has a hand grip slidably engaged in the lower portion. Two blocks are secured to the lower ends of the tubes. Two catches are slidably engaged in the blocks. Two bars are slidably engaged in the catches and the blocks and coupled to the hand grip. The catches are forced to engage with the teeth when the hand grip is not pulled and are disengaged from the teeth so as to release tubes from the pipes when the hand grip is released.

1 Claim, 3 Drawing Sheets

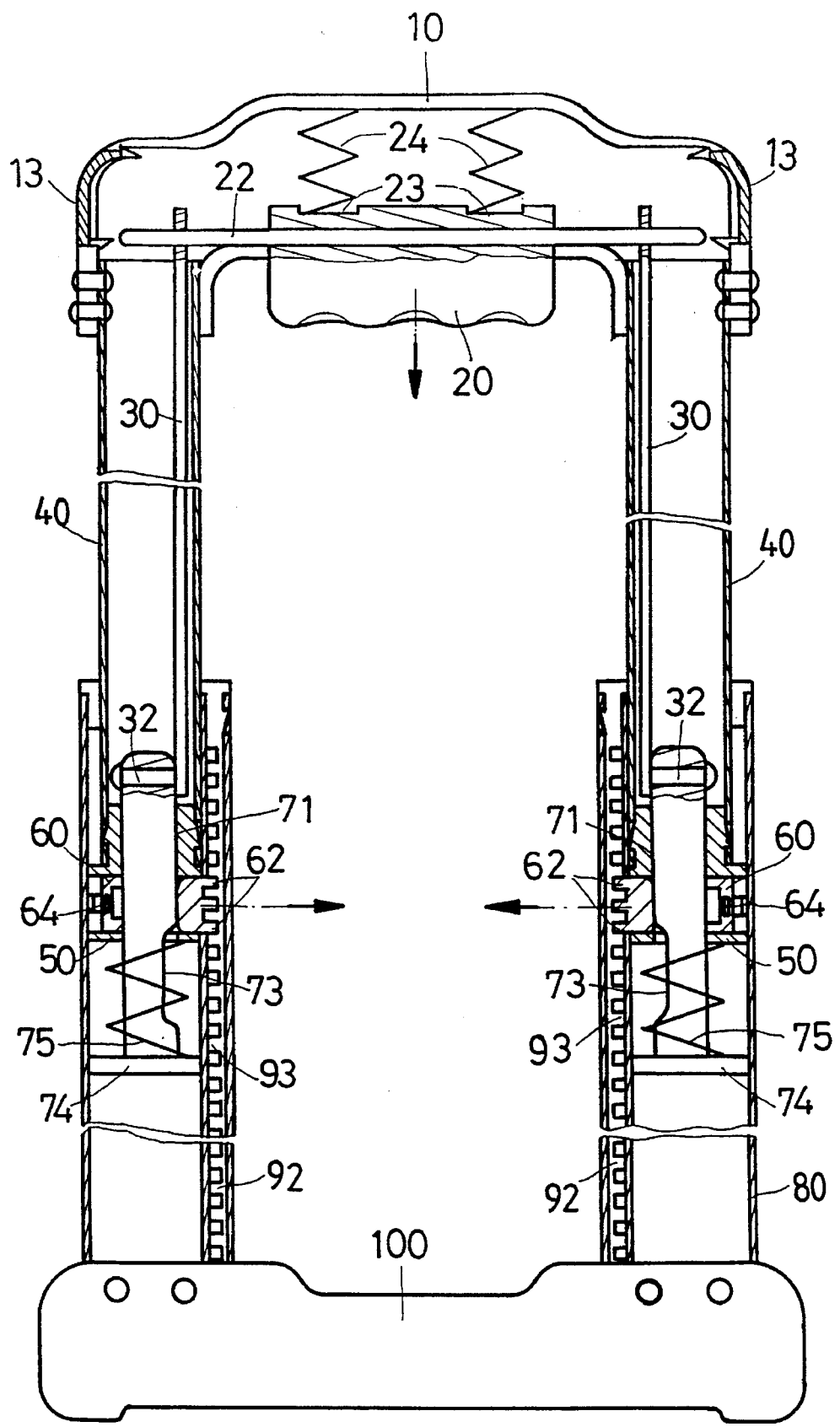
F I G . 2

ADJUSTABLE HANDLE ASSEMBLY

BACKGROUND OF THE INVENTION

1. Field of the Invention

The present invention relates to a handle, and more particularly to an adjustable handle assembly for push cars or for baggages.

2. Description of the Prior Art

Typical push cars or baggages comprise a handle assembly for moving the push cars or the baggages. However, normally, the handle assemblies comprise a rather complicated configuration which is adverse for both manufacturing and operation purposes.

The present invention has arisen to mitigate and/or obviate the afore-described disadvantages of the conventional handle assemblies for push cars or for baggages.

SUMMARY OF THE INVENTION

The primary objective of the present invention is to provide an adjustable handle assembly which includes a simplified configuration that can be easily operated.

In accordance with one aspect of the invention, there is provided a handle assembly comprising two pipes each including an open upper end and including a plurality of first teeth provided therein, two tubes including upper ends and lower ends slidably engaged in the pipes via the open upper ends of the pipes, a handle secured on the upper ends of the tubes and including a lower portion having an access formed therein, a hand grip slidably engaged in the access of the handle, two blocks secured to the lower ends of the tubes and each including a lateral orifice and a vertical orifice intersecting with each other, two catches slidably engaging in the lateral orifices of the blocks and each including at least one second tooth for engaging with the first teeth of the pipes and each including an aperture formed therein, means for biasing the catches away from the first teeth, two bars slidably engaged in the apertures of the catches and in the vertical orifices of the blocks, the bars each including an acting surface for engaging with the catches and for forcing the second tooth to engage with the first teeth so as to secure the tubes to the pipes, and each including a recess for engaging with the catches so as to allow disengaging of the second tooth from the first teeth and so as to release the tubes from the pipes, means for coupling the bars to the hand grip such that the hand grip and the bars move in concert, and means for biasing the bars and the hand grip away from the handle so as to allow engagement of the acting surfaces of the bars with the catches and so as to engaging the second tooth with the first teeth.

Further objectives and advantages of the present invention will become apparent from a careful reading of a detailed description provided hereinbelow, with appropriate reference to accompanying drawings.

BRIEF DESCRIPTION OF THE DRAWINGS

FIGS. 2 and 3 are cross sectional views illustrating the operation of the handle assembly.

DETAILED DESCRIPTION OF THE PREFERRED EMBODIMENT

Figure 1:
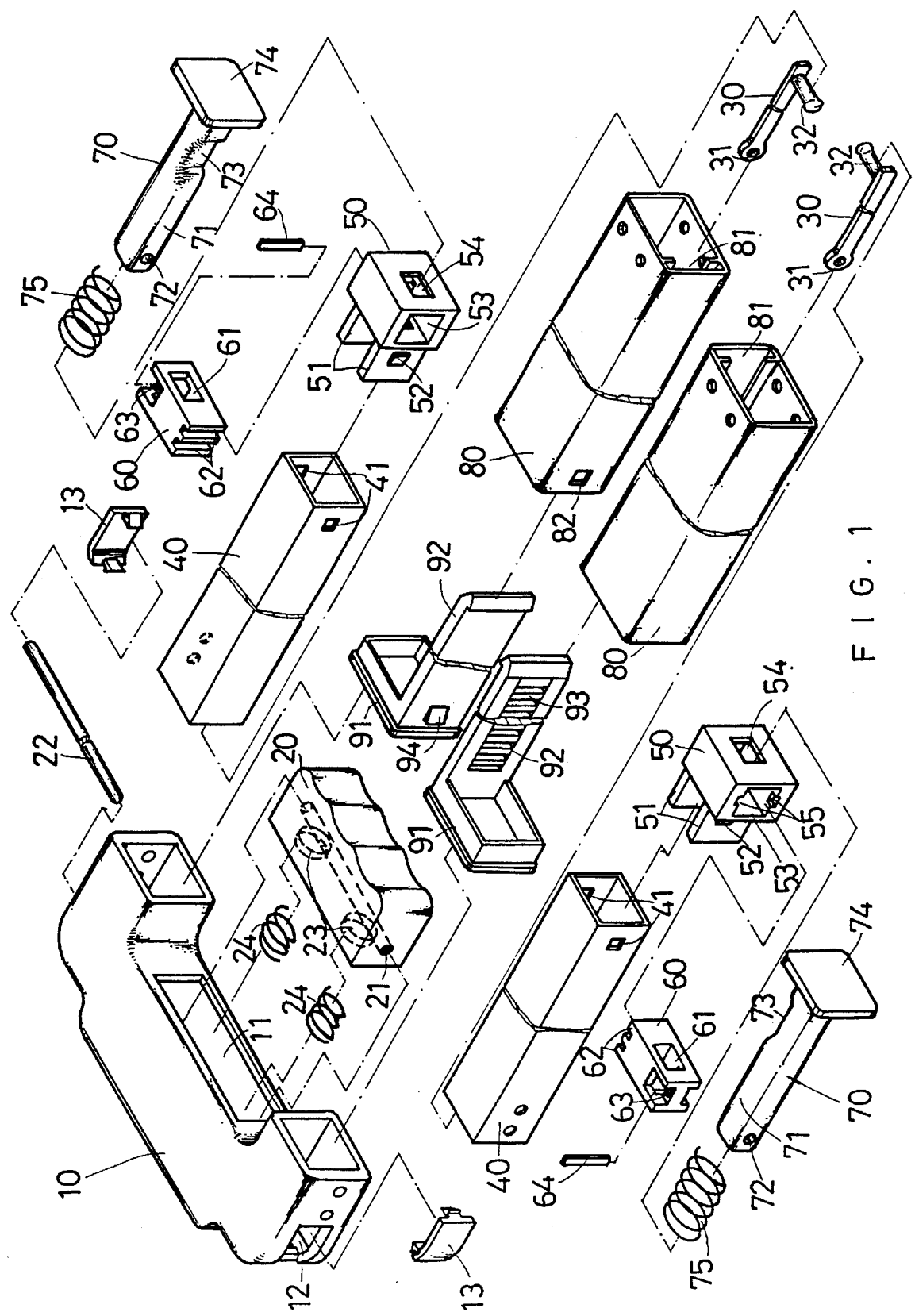
FIG. 1 is an exploded view of an adjustable handle assembly in accordance with the present invention.

Referring to the drawings, and initially to FIGS. 1 and 2, an adjustable handle assembly in accordance with the present invention comprises a base 100 which is secured to a push car or a baggage. Two pipes 80 having a lower end secured to the base 100 and each includes a channel 81 longitudinally formed therein and each includes an open upper end having an opening 82 formed in the side portion. Two plates 92 are engaged in the channels 81 and each includes a number of teeth 93 formed therein, a bulge 94 for engaging with the opening 82 of the pipe 80 so as to secure the plates 92 to the pipes 80, and a hollow frame 91 for engaging with the open upper end of the pipes 80.

Figure 3:
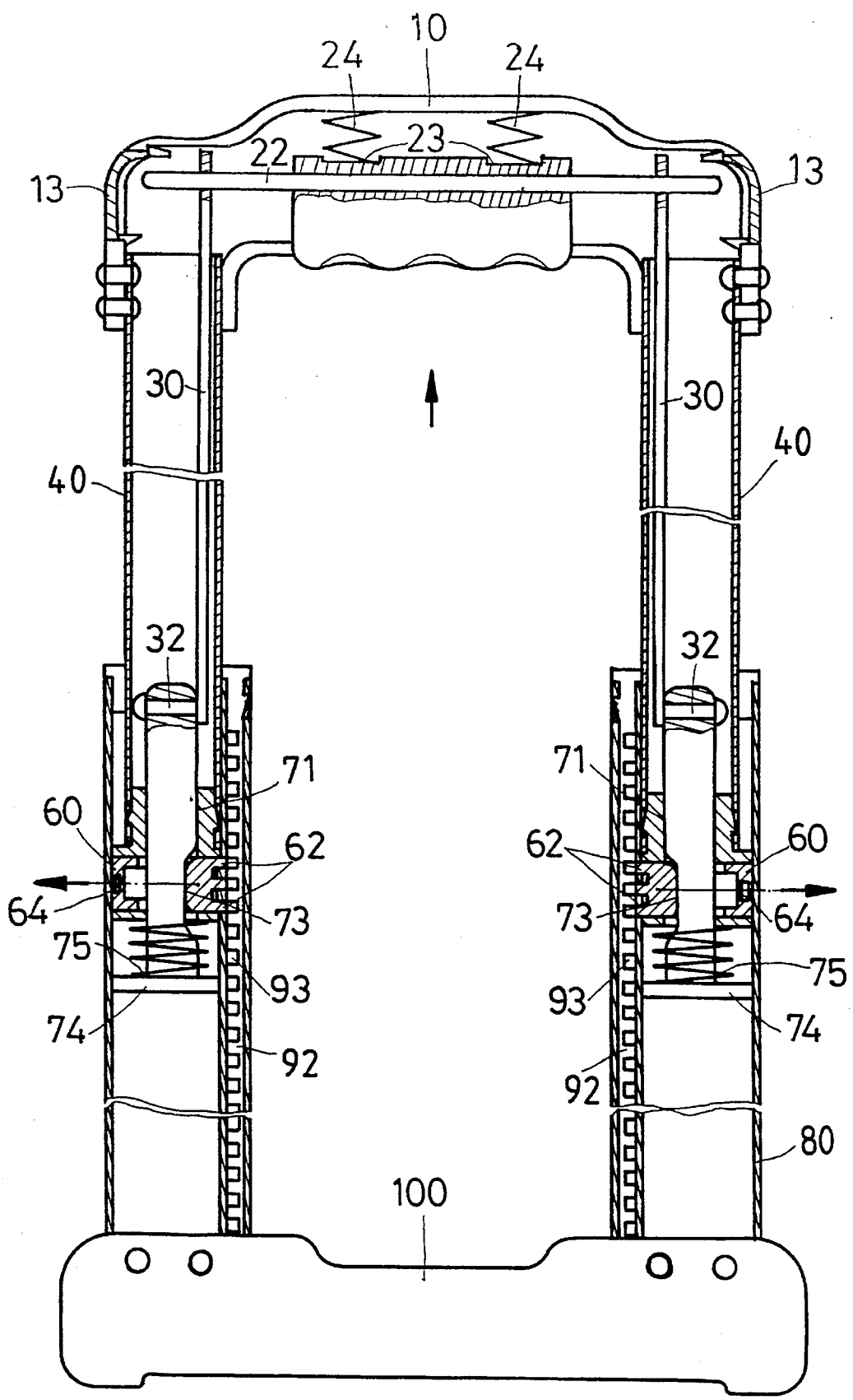

Two tubes 40 include lower ends slidably engaged in the pipes 80 respectively and having two holes 41 formed therein. Two blocks 50 each includes two lugs 51 engaged in the lower ends of the tubes 40 and having projections 52 for engaging with the holes 41 so as to secure the blocks 50 to the tubes 40. The blocks 50 each includes a lateral orifice 53 for slidably receiving a catch 60, and a vertical orifice 54 intersecting with the lateral orifice 53 for slidably engaging with a bar 70. The catch 60 includes an aperture 61 formed therein for slidably engaging with the bar 70. Two notches 55 are formed in one end of each of the lateral orifices 53. The catches 60 each includes one end having a number of teeth 62 formed therein for engaging with the teeth 93 of the plate 92 and the other end having a puncture 63 formed therein for engaging with a resilient blade 64, the blades 64 each includes two ends engaged in the notches 55 of the blocks 50 for biasing the catches 60 away from the plates 92 (FIG. 3). The bars 70 each include a board 74 formed in the bottom portion. Two springs 75 are engaged on the bars 70 and biased between the boards 74 and the blocks 50 for biasing the boards 74 away from the blocks 50. The bars 70 each includes an active surface 71 for engaging with the catches 60 so as to force the teeth 62 of the catches 60 to engage with the teeth 93 of the plates 92 (FIG. 2), and each includes a recess 73 for receiving with the catches 60 (FIG. 3) so as to allow disengagement of the teeth 62 from the teeth 93 when the catches 60 are biased away from the plates 92 by the resilient blades 64.

A handle 10 is fixed on top of the tubes 40 and includes two sides each having an opening 12 formed therein for inserting a rod 22. Two caps 13 may engage with the openings 12 for enclosing the openings 12. The handle 10 includes a bottom portion having an access 11 formed therein for slidably engaging with a hand grip 20. The hand grip 20 includes a hole 21 laterally formed therein for engaging with the rod 22 and two depressions 23 for engaging with two springs 24 which are biased between the handle 10 and the hand grip 20 for biasing the hand grip 20 downward through the access 11. Two links 30 each includes a hole 31 formed in one end for engaging with the end portions of the rod 22 and each includes a pin 32 secured thereto for engaging with two holes 72 of the bars 70 such that the bars 70 and the links 30 move in concert with the hand grip 20.

In operation, as shown in FIG. 2, when the hand grip 20 is not pulled by the users, the springs 24 and the springs 75 bias the hand grip 20 and the bars 70 downward such that the acting surfaces 71 of the bars 70 are engaged with the catches 60 so as to force the teeth 62 of the catches 60 to engage with the teeth 93 of the plates 92 and such that the tubes 40 can be secured to the pipes 80. However, as shown in FIG. 3, when the hand grip 20 is pulled against the springs 24 and the springs 75, the recesses 73 of the bars 70 are engaged with the catches. At this moment, the resilient blades 64 bias the catches 60 away from the plates 92 such that the teeth 62 are disengaged from the teeth 93 of the plates 92. At this moment, the tubes 40 may slide freely in the pipes 80 and may be secured to the pipes 80 again when the hand grip 20 is released.

Accordingly, the handle assembly in accordance with the present invention includes a simplified configuration which can be easily operated. It is only required to pull the hand grip 20 so as to adjust the relative position of the tubes 40 to the pipes 80.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A handle assembly comprising:

two pipes each including an open upper end and including a plurality of first teeth provided therein, two tubes including upper ends and lower ends slidably engaged in said pipes via said open upper ends of said pipes, a handle secured on said upper ends of said tubes and including a lower portion having an access formed therein, a hand grip slidably engaged in said access of said handle, two blocks secured to said lower ends of said tubes and each including a lateral orifice and a vertical orifice intersecting with each other, two catches slidably engaging in said lateral orifices of said blocks and each including at least one second tooth for engaging with said first teeth of said pipes and each including an aperture formed therein, means for biasing said catches away from said first teeth, two bars slidably engaged in said apertures of said catches and in said vertical orifices of said blocks, said bars each including an acting surface for engaging with said catches and for forcing said second tooth to engage with said first teeth so as to secure said tubes to said pipes, and each including a recess for engaging with said catches so as to allow disengaging of said second tooth from said first teeth and so as to release said tubes from said pipes, means for coupling said bars to said hand grip such that said hand grip and said bars move in concert, and means for biasing said bars and said hand grip away from said handle so as to allow engagement of said acting surfaces of said bars with said catches and so as to engaging said second tooth with said first teeth.

* * * * *